United States Patent
Aoki et al.

(10) Patent No.: US 8,879,434 B2
(45) Date of Patent: Nov. 4, 2014

(54) WIRELESS COMMUNICATION APPARATUS AND METHOD

(71) Applicants: Tsuguhide Aoki, Kawasaki (JP); Yasuhiko Tanabe, Kawasaki (JP)

(72) Inventors: Tsuguhide Aoki, Kawasaki (JP); Yasuhiko Tanabe, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 144 days.

(21) Appl. No.: 13/729,624

(22) Filed: Dec. 28, 2012

(65) Prior Publication Data

US 2013/0250872 A1    Sep. 26, 2013

(30) Foreign Application Priority Data

Mar. 23, 2012 (JP) ................. 2012-067843

(51) Int. Cl.
| | |
|---|---|
| *H04W 72/04* | (2009.01) |
| *H04W 52/24* | (2009.01) |
| *H04W 52/26* | (2009.01) |
| *H04L 12/28* | (2006.01) |
| *H04B 7/00* | (2006.01) |

(52) U.S. Cl.
CPC .......... *H04W 72/0406* (2013.01); *H04W 52/24* (2013.01); *H04W 52/265* (2013.01); *H04L 12/28* (2013.01); *H04B 7/00* (2013.01); *H04W 72/0446* (2013.01)
USPC .......................................... 370/278; 370/282

(58) Field of Classification Search
CPC ......... H04L 12/28; H04B 7/00; H04W 52/24; H04W 52/265
USPC ................................. 370/278, 282
See application file for complete search history.

(56) References Cited

U.S. PATENT DOCUMENTS

| | | | | |
|---|---|---|---|---|
| 7,340,267 | B2 * | 3/2008 | Budka et al. ................ | 455/522 |
| 7,570,970 | B2 * | 8/2009 | Duan et al. ................. | 455/522 |
| 7,738,889 | B2 * | 6/2010 | Nakada ....................... | 455/506 |
| 8,144,732 | B2 * | 3/2012 | Chen .......................... | 370/468 |
| 8,379,749 | B2 * | 2/2013 | Taoka et al. ................. | 375/267 |
| 8,665,990 | B2 * | 3/2014 | Xi et al. ...................... | 375/295 |
| 2003/0109274 | A1 * | 6/2003 | Budka et al. ................ | 455/522 |
| 2004/0077357 | A1 * | 4/2004 | Nakada ..................... | 455/452.1 |
| 2006/0034226 | A1 * | 2/2006 | Gu et al. ..................... | 370/332 |

(Continued)

FOREIGN PATENT DOCUMENTS

| | | |
|---|---|---|
| JP | 2002-530998 A | 9/2002 |
| JP | 2003-318816 A | 11/2003 |

(Continued)

OTHER PUBLICATIONS

Japanese Office Action dated Sep. 10, 2013 (and English translation thereof) in counterpart Japanese Application No. 2012-067843.

*Primary Examiner* — Jay P Patel
(74) *Attorney, Agent, or Firm* — Holtz, Holtz, Goodman & Chick PC

(57) ABSTRACT

According to one embodiment, a wireless communication apparatus includes a calculator and a controller. The calculator multiplies a first weighting factor by a first data signal to be transmitted on a first channel, the first weighting factor is based on a second weighting factor multiplied by a second data signal received on the first channel. The controller controls a transmission to transmit to a destination device a control signal if the first data signal transmitted to the partner device exists, and no second data signal to be transmitted on the first channel exists in the device.

15 Claims, 9 Drawing Sheets

(56) References Cited

U.S. PATENT DOCUMENTS

| | | | |
|---|---|---|---|
| 2008/0057963 A1* | 3/2008 | Kayama et al. | 455/442 |
| 2012/0122407 A1* | 5/2012 | Allpress et al. | 455/67.11 |
| 2013/0129010 A1* | 5/2013 | Xi et al. | 375/295 |
| 2013/0142278 A1* | 6/2013 | Taoka et al. | 375/295 |
| 2013/0163545 A1* | 6/2013 | Taoka et al. | 370/329 |

FOREIGN PATENT DOCUMENTS

| | | |
|---|---|---|
| JP | 2010-011476 A | 1/2010 |
| JP | 2010-56714 A | 3/2010 |
| JP | 2012-044315 A | 3/2012 |

\* cited by examiner

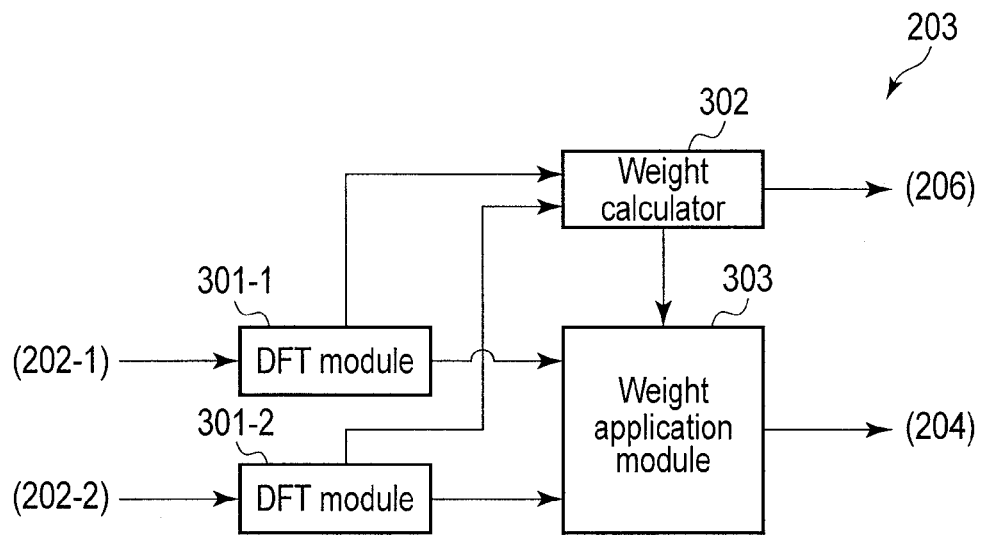
F I G. 3
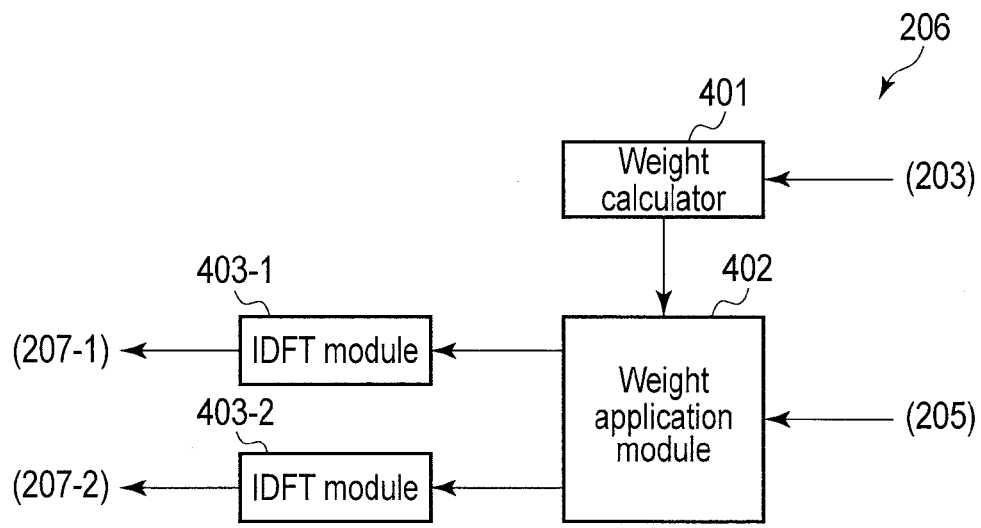
F I G. 4

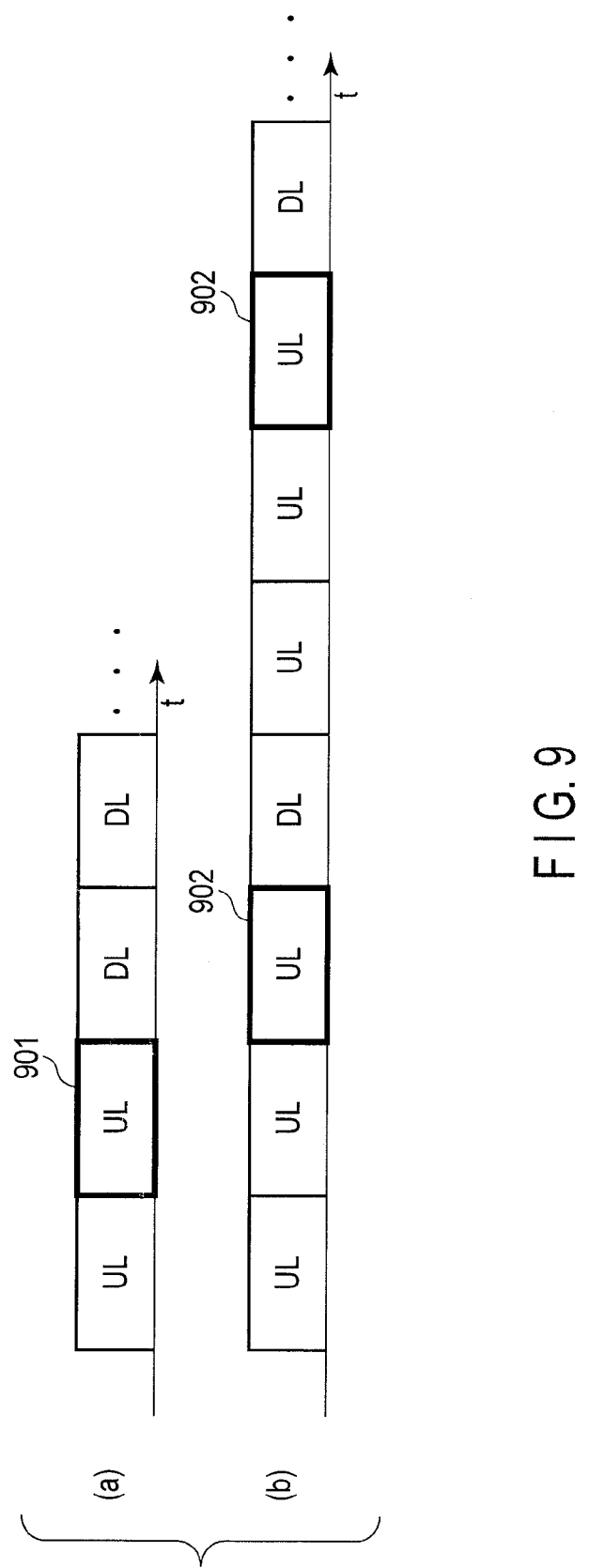
F I G. 9

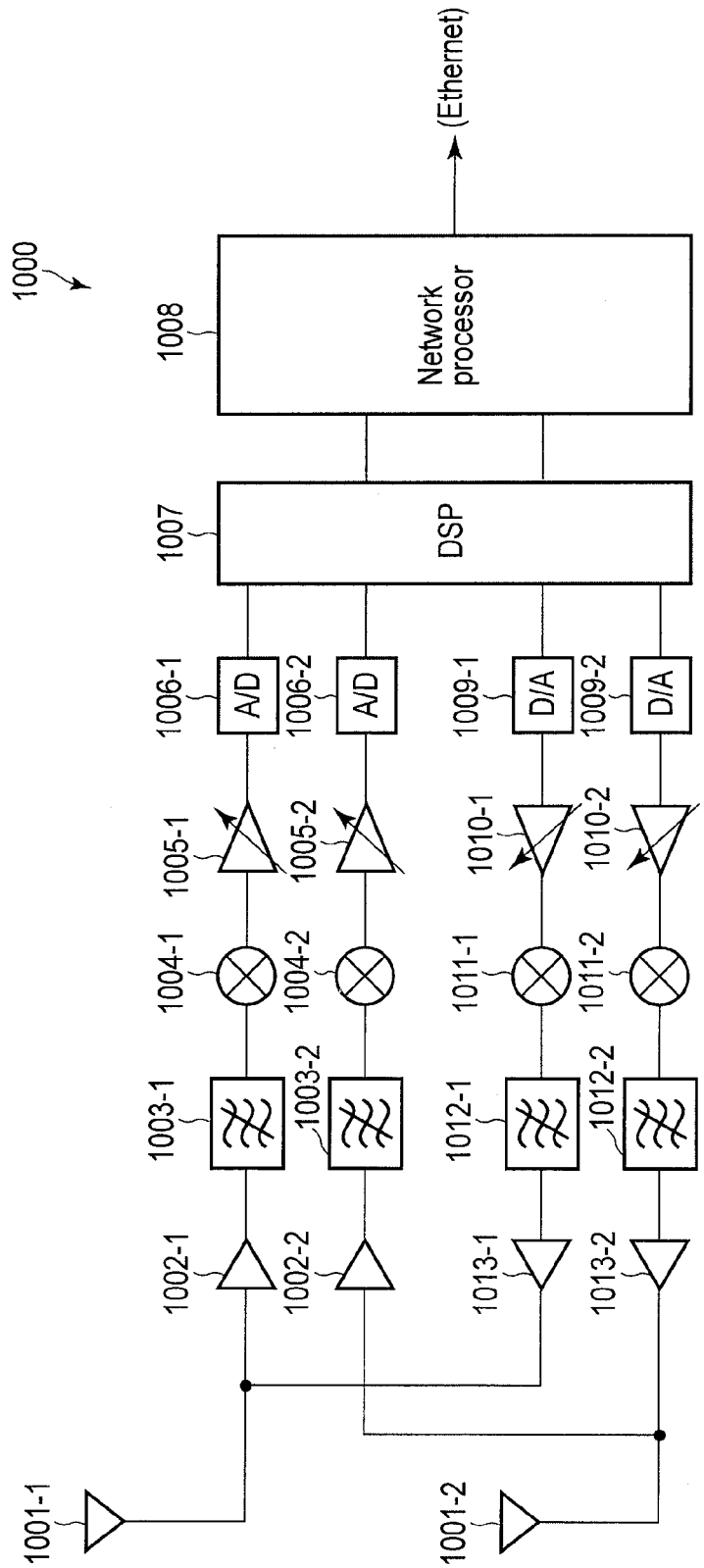
F I G. 10

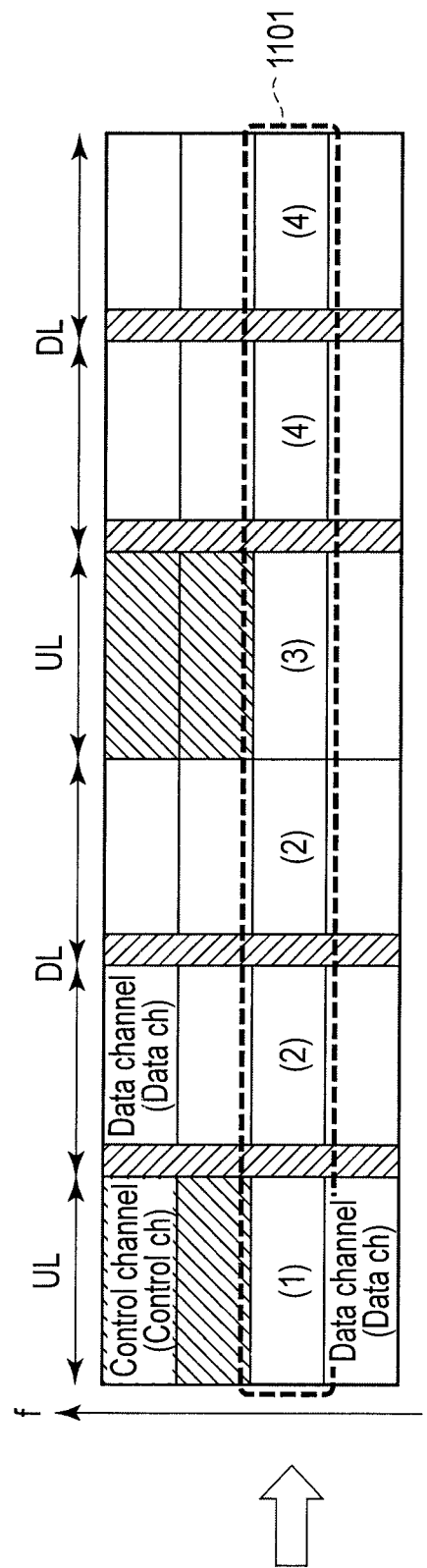
F I G. 11A

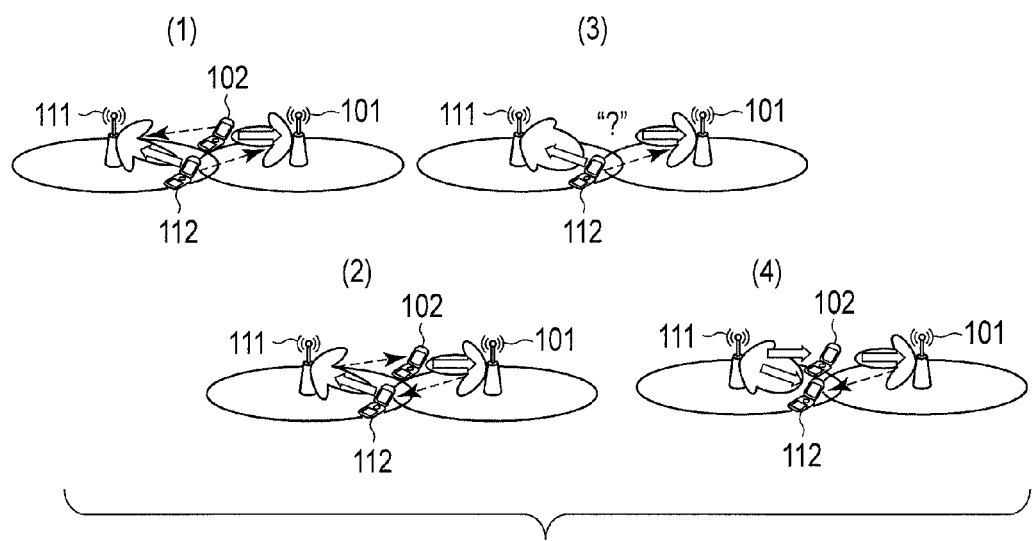
F I G. 11B

US 8,879,434 B2

WIRELESS COMMUNICATION APPARATUS AND METHOD

CROSS-REFERENCE TO RELATED APPLICATIONS

This application is based upon and claims the benefit of priority from Japanese Patent Application No. 2012-067843, filed Mar. 23, 2012, the entire contents of which are incorporated herein by reference.

FIELD

Embodiments described herein relate generally to a wireless communication apparatus and method.

BACKGROUND

Recent cellular systems such as the 3rd Generation Partnership Project (3GPP) Long-Term Evolution (LTE) system, the next generation Personal Handyphone System (PHS), and WiMAX® reuse a single frequency band in adjacent cells to increase the efficiency of frequency use. In using a single frequency band across cells, a terminal at a cell edge may experience interference. Such interference can be reduced by using a signal processing technology involving multiple antennas such as the Adaptive Antenna System (ASS) or Adaptive Array Antenna (AAA). In a time-division duplex (TDD) system, the same frequency is used for both the uplink and the downlink where data from a terminal to a base station is allocated in the uplink and data from a base station to a terminal is allocated in the downlink. Therefore, the reciprocity of channel holds between the uplink and the downlink. Interference can be reduced by applying the weighting factor for the uplink to the downlink.

BRIEF DESCRIPTION OF THE DRAWINGS

FIG. 3 is a block diagram illustrating the uplink ASS module.

FIG. 4 is a block diagram illustrating the downlink ASS module.

FIG. 9 illustrates a transmission timing of uplink grant according to the third embodiment.

FIG. 10 illustrates an example of the wireless communication apparatus.

FIG. 11A illustrates an example of the conventional LTE frame format.

FIG. 11B is an exemplary conceptual diagram illustrating an example of data transmission and reception in accordance with the conventional LTE frame format.

DETAILED DESCRIPTION

In the LTE frame format specification, there is a case where data exists in the downlink but not in the uplink. In this case, the terminal transmits via the uplink a response to the data such as an acknowledgement (ACK) or negative-acknowledgement (NACK) using a control channel having a frequency different from that of the data channel through which the terminal transmits data to the base station. The system must therefore use different frequencies for the downlink and uplink. Accordingly, different propagation paths will be used, and the same weighing factor cannot be used for the downlink and uplink. This causes interference and degrades the received signal.

In general, according to one embodiment, a wireless communication apparatus includes a calculator and a controller. The calculator is configured to multiply a first weighting factor by a first data signal to be transmitted on a first channel, the first weighting factor is based on a second weighting factor multiplied by a second data signal received on the first channel. The controller is configured to control a transmission to transmit to a destination device a control signal if the first data signal transmitted to the destination device exists, and no second data signal to be transmitted on the first channel exists in the destination device, the control signal including an instruction to transmit a signal on the first channel without transmitting a transmission acknowledge signal relating to the first data signal on a second channel which is different from the first channel.

A wireless communication apparatus and method according to one embodiment of the present disclosure will be described in detail below with reference to the drawings. In the description below, parts labeled with the same reference sign perform the same operations, and duplicate explanations are omitted.

(First Embodiment)

Figure 1:
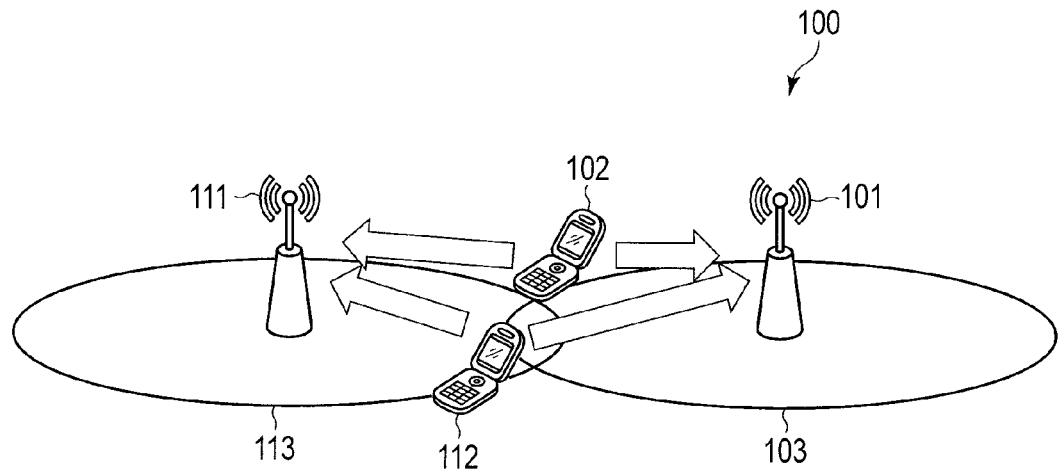
FIG. 1 is an exemplary conceptual diagram of a wireless communication system.

A description of the wireless communication system according to the first embodiment with reference to FIG. 1 follows.

A wireless communication apparatus 100 includes a base station 101, a terminal 102, a base station 111 and a terminal 112.

The base station 101 accommodates the terminal 102, and the base station 111 accommodates the terminal 112. The base station 101 and the base station 111 use the same frequency to perform wireless communication with the terminal 102 and the terminal 112, respectively.

In the example shown in FIG. 1, the terminal 102 and the terminal 112 exist in an area where a cell 103 of the base station 101 and a cell 113 of the base station 111 overlap. It is assumed that these terminals interfere with each other if the same frequency band is used. In this embodiment, an uplink (receiving segment) indicates data transmission from a terminal to a base station, and a downlink (transmitting segment) indicates data transmission from a base station to a terminal.

The block diagram of the base station that is a wireless communication apparatus according to the embodiment shown in FIG. 2 will be explained.

The base station 101 according to the embodiment includes an antenna 201-1, an antenna 201-2, a receiver 202-1, a receiver 202-2, an uplink Adaptive Antenna System (AAS) module 203, a demodulator 204, a modulator 205, a downlink AAS module 206 (calculator), a transmitter 207-1, a transmitter 207-2, and a wireless resource controller 208. Since the configuration of the base station 111 is similar to that of the base station 101, the explanation will be omitted.

Antenna 201-1 and antenna 201-2 each receive a signal from the terminal and obtain a received signal that is an analog signal. In addition, antenna 201-1 and antenna 201-2 each receive a transmission signal that is an analog signal from the transmitter 207-1 and the transmitter 207-2 described below, respectively, and transmit the transmission signal to the terminal.

The receiver 202-1 and the receiver 202-2 each receive a received signal from the antenna 201-1 and the antenna 201-2, respectively, and perform general processing such as down-conversion, filtering, amplification, analog-to-digital conversion to the received signal to obtain a digital received signal.

The uplink AAS module 203 receives the digital received signal and performs AAS processing to reduce interference received from the terminal. The reduction of interference received from the terminal is reducing interference received by the base station 101 from another terminal that is different from a communication partner terminal. The uplink AAS module 203 will be explained in detail with reference to FIG. 3.

The demodulator 204 receives the digital received signal in which interference received from the terminal is reduced from the uplink AAS module 203, and demodulates the digital received signal to obtain a received bit sequence. The demodulated receiving bit sequence is output to an upper layer (not shown).

The modulator 205 receives a transmission bit sequence regarding data to be transmitted from the upper layer and obtain a digital transmission signal by modulating the transmission bit sequence.

The downlink ASS module 206 receives a weighting factor from the uplink AAS module 203 and receives the digital transmission signal from the modulator 205. The downlink ASS module 206 performs ASS processing to reduce interference received from the base station, based on the weighting factor received from the uplink AAS module 203. The reduction of interference received from the base station is reducing interference received by another terminal that is different from the communication partner terminal from the base station 101. The down AAS module 206 will be explained in detail with reference to FIG. 4.

Each of the transmitter 207-1 and transmitter 207-2 receives a digital transmission signal in which interference received from the terminal is reduced from the downlink ASS module 206, and performs general processing such as digital-to-analog conversion, amplification, up-conversion to generate a transmission signal.

The wireless resource controller 208 controls the uplink AAS module 203 and the downlink ASS module 206 to use a resource block (RB) belonging to the same frequency band for both uplink and downlink relative to the terminal. It is assumed that a data signal to be transmitted from the base station 101 to the terminal 102 exists, and a data signal to be transmitted from the terminal 102 to the base station 101 does not exist. In this case, a transmission acknowledgment regarding the data signal is not transmitted on the control channel in the uplink, and a control signal to instruct the terminal 102 to transmit a signal on the data channel is generated. The operation of the wireless resource controller 208 will be explained with reference to FIG. 7 later. In accordance with the LTE standard, when no data signal to be transmitted exists in the uplink, the terminal 102 transmits the transmission acknowledgement relative to the data signal received from the base station 101 on the control channel. On the other hand, when data signal to be transmitted exists in the uplink, the transmission acknowledgement relative to the data signal received from the base station 101 is multiplexed with the data signal and transmitted on the data channel.

Figure 2:
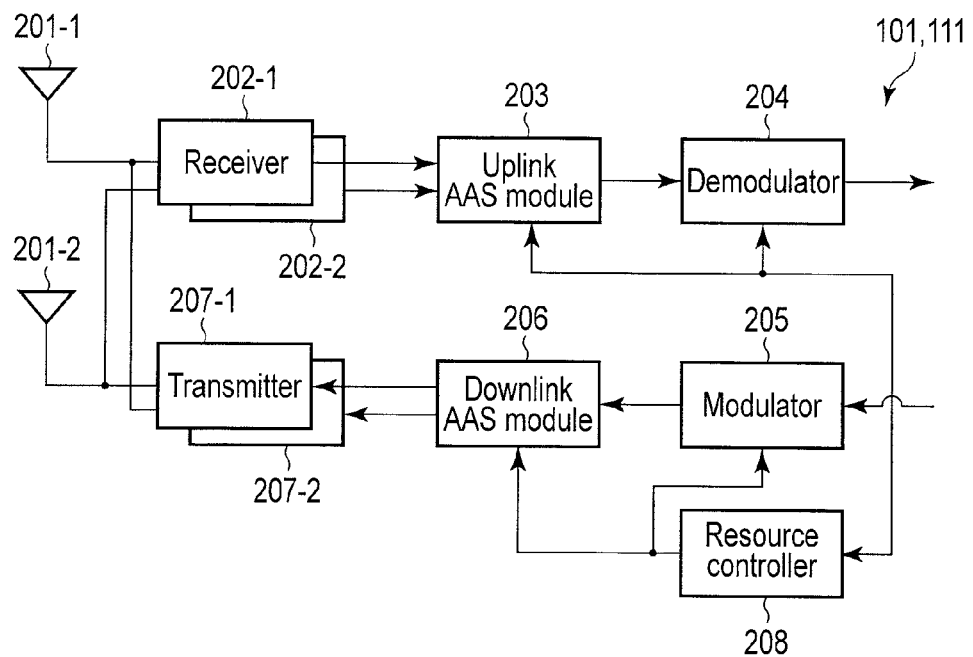
FIG. 2 is a block diagram illustrating a wireless communication apparatus according to the first embodiment.

In FIG. 2, the wireless communication apparatus has two antennas 201; however, it may have three or more antennas. In this case, the number of the reception modules 202 and the transmission modules 207 may be determined in accordance with the number of antennas.

The uplink AAS module 203 will be explained with reference to the block diagram shown in FIG. 3.

The uplink AAS module 203 includes a discrete Fourier transform (DFT) module 301-1 and a DFT module 301-2, a weight calculator 302, and a weight application module 303. The number of DFT modules 301 may be determined in accordance with the number of the receiving modules 202.

Each of the DFT module 301-1 and the DFT module 301-2 receives a digital received signal from the receiver 202-1 and the receiver 202-2, respectively and performs DFT to the digital received signal to convert it into a digital received signal on the frequency domain.

The weight calculator 302 receives the digital received signal performed DFT at the DFT module 301-1 or the DFT module 301-2, and calculates a weighting factor regarding a propagation path by using a reference signal in the digital received signal. The reference signal is a known signal at the base station 101.

The weight application module 303 receives the digital received signal performed DFT from the DFT module 301-1 or the DFT module 301-2, and receives the weighting factor from the weight calculator 302. The weight application module 303 multiplies the digital received signal performed DFT by the weighting factor to perform uplink ASS processing and to calculate the digital received signal in which interference received from the terminal is reduced.

It is not necessary to always apply uplink AAS processing to a digital received signal after DFT is performed. However, the LTE system is designed for the signal processing on the frequency domain. Thus, the present embodiment explains processing on the frequency domain that applies DFT.

The detailed weight calculation and weight application will be explained.

For example, the minimum mean square error (MMSE) criteria method can be applied to calculation of the uplink AAS module 203. If it is assumed that the received signals received by the antenna 201-1 and the antenna 201-2 are $x_1$ and $x_2$, and the combined vector is $x=[x_1, x_2]T$, the weighting factor of the uplink AAS is given by $$w_{rx}=R_{xx}^{-1}r_{xr}, \quad (1)$$

where $[\ ]^T$ indicates transpose, and $R_{xx}$ and $r_{xr}$ represent a correlation matrix and a correlation vector of a reference signal, respectively.
$R_{xx}$ is given by $$R_{xx}=E(xx^H), \quad (2)$$

and $r_{xr}$ is given by $$r_{xr}=E(xd^*), \quad (3)$$

where d is a reference signal which is not affected by a propagation path or noise, E( ) is an ensemble average, "$^H$" indicates complex transpose, and "*" indicates complex conjugation. Since the ensemble average is difficult to calculate, it can be replaced with an average on the time domain or frequency domain in which values do not greatly vary.

Applying the weighting factor calculated as described above to the digital received signal realizes reduction of interference received from the terminal.

The downlink AAS module 206 will be explained with reference to the block diagram shown in FIG. 4.

The downlink AAS module 206 includes a weight calculator 401, a weight application module 402, an inverse DFT (IDFT) module 403-1 and an IDFT module 403-2.

The weight calculator 401 receives the weighting factor from the weight calculator 302 of the uplink AAS module 203, and calculates a weighting factor which is corrected for downlink. The most simple way to calculate the weighting factor for downlink from the weighting factor of uplink is to set the weighting factor $w_{tx}$ of downlink to be the same as the weighting factor $w_{rx}$ of uplink. However, there are many cases where reciprocity between uplink and downlink can be realized, but not for the inner propagation path between receiver and transmitter. Accordingly, it is desirable to correct the weighing factor for downlink by performing calibration processing, for example.

The weight application module 402 receives a digital transmission signal from the modulator 205, and the weighting factor $w_{tx}$ for downlink from the weighting calculator 401, and multiplies the digital transmission signal by the weighting factor $w_{tx}$. Concretely, if it is assumed that the digital transmission signal is "s", the transmission signals to be transmitted to the transmitter 207-1 and the transmitter 207-2 in which interference received from the base station is reduced after downlink ASS processing are $y_1$ and $y_2$, and the combined signal vector is $y=[y_1, y_2]^T$, y is given by $$y=w^*_{tx}s, \quad (4)$$

where $w_{tx}$ is a transmission weight.

Each of the IDFT module 403-1 and IDFT module 403-2 receives a transmission signal in which interference received from the base station is reduced from the weight application module 402, performs IDFT to the transmission signal in which interference received from the base station is reduced to convert the transmission signal into the digital transmission signal on the time domain.

An example of LTE frame format will be explained with reference to FIG. 5.

Figure 5:
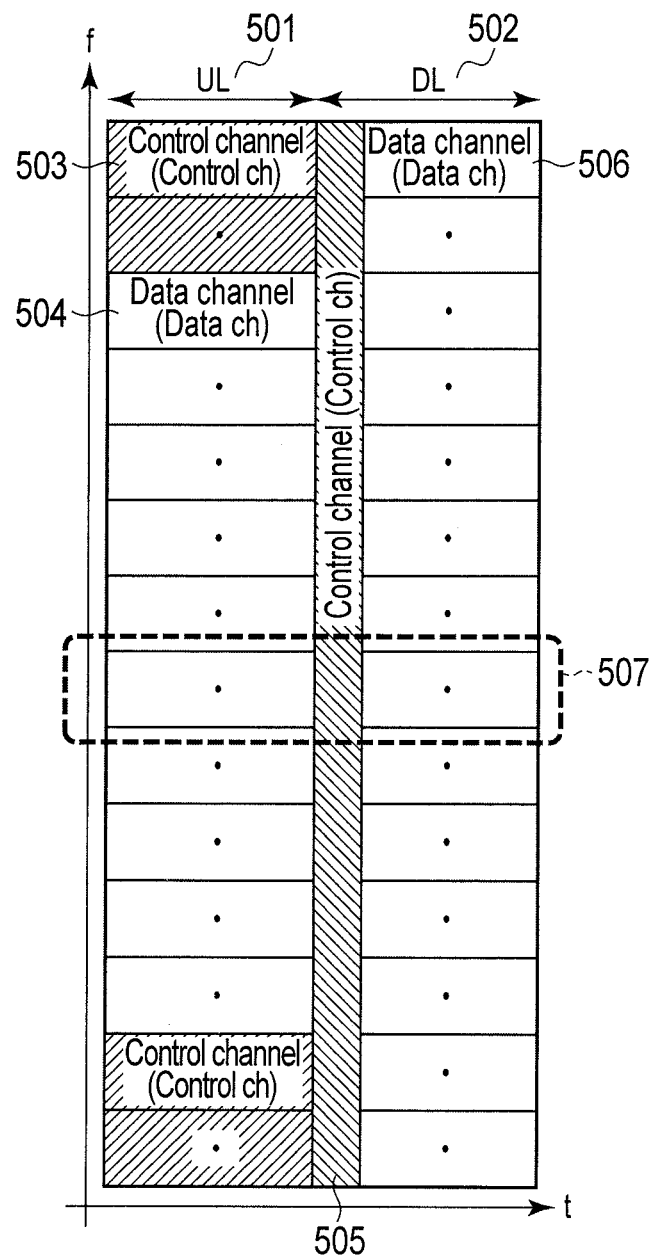
FIG. 5 illustrates an example of the LTE frame format.

FIG. 5 is an extract of the frame format. The vertical axis indicates frequency, and the horizontal axis indicates time. UL 501 indicates a sub-frame of uplink, and DL 502 indicates a sub-frame of downlink.

The UL 501 includes control channels 503 and data channels 504. The control channels 503 are arranged at both high frequency end and low frequency end of the frequency band used by the UL 501, and the data channels 504 are arranged in the remainder of the frequency band.

For the DL 502, control channel 505 is arranged at the head of each data channel 506 throughout the frequency band.

The region enclosed with a broken line indicates a resource block 507. If the same resource block can be allocated for uplink and downlink, it is possible to apply the weighting factor of ASS used for the uplink to the downlink. This realizes reduction of interference received both from the terminal and the base station.

Figure 6:
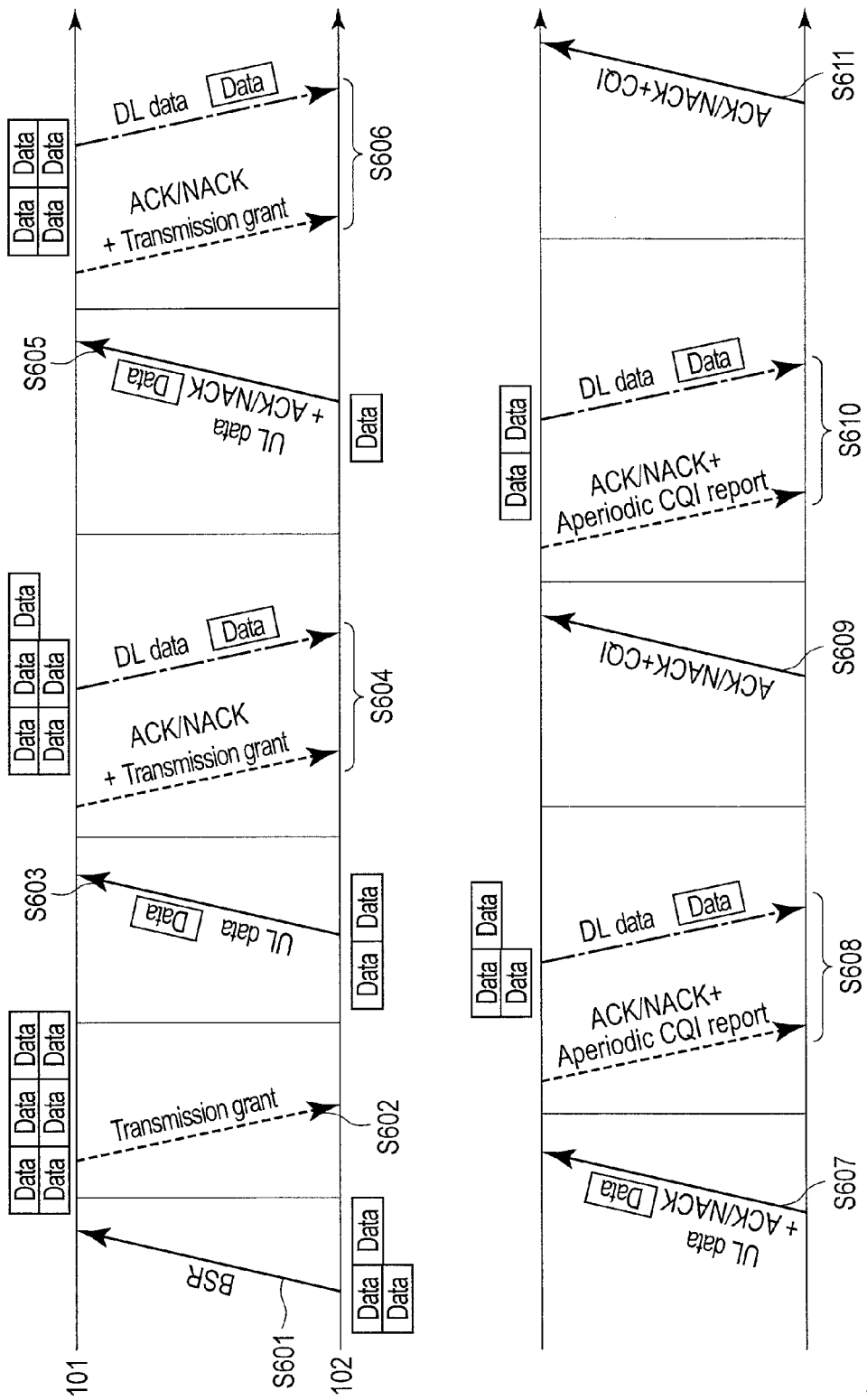
FIG. 6 illustrates an example of sequence of data transmission and reception in accordance with the LTE frame format.

Data transmission and reception in accordance with the LTE frame format according to the present embodiment will be explained with reference to the sequence shown in FIG. 6. Line 101 represents a timeline for the base station 101, and line 102 represents a timeline for the terminal 102.

In step S601, the terminal 102 transmits a buffer status report (BSR) on the data channel of the uplink to the base station 101. The BSR indicates how much data to be transmitted to the base station 101 (hereinafter, referred to as UL data) the terminal 102 holds. In this embodiment, it is assumed that the terminal 102 holds three pieces of UL data.

In step S602, the base station 101 transmits a transmission grant to the terminal 102 on the control channel of the downlink. In the LTE system, the base station issues all transmission instructions for the uplink of the terminal. That is, the transmission grant to the terminal is issued by the base station by using a signal called "uplink grant." The base station decides at what timing the terminal transmits a signal to the base station.

In step S603, the terminal 102 transmits the UL data on the data channel of the uplink to the base station 101.

In step S604, the base station 101 transmits an Acknowledgement (ACK) or a Negative-acknowledgement (NACK) indicating whether or not the UL data is successfully received from the terminal 102 and decoded, and the transmission grant to the terminal 102 on the control channel of the downlink. The base station 101 transmits data to be transmitted to the terminal 102 on the data channel of the downlink (hereinafter, referred to as DL data) to the terminal 102.

In step S605, the terminal 102 transmits an ACK or a NACK indicating whether or not DL data is successfully received from the base station 101 and decoded, and UL data to the base station 101 on the data channel of the uplink.

In step S606, the base station 101 transmits an ACK or a NACK regarding the UL data, and DL data to the terminal 102 as same as step S604.

In step S607, the terminal 102 transmits an ACK or a NACK regarding the DL data, and UL data to the base station 101 as same as step S605. In this step, it is assumed that the terminal 102 has completed transmission of all UL data to be transmitted.

In step S608, the base station 101 transmits DL data on the data channel of the downlink as same as step S604 and step S606. The base station 101 transmits a control signal in addition to an ACK or a NACK regarding the UL data to the terminal 102 on the control channel of the down link.

The control signal indicates designation of channel to which the UL data is transmitted and an instruction of aperiodic channel quality indicator (CQI) report. The aperiodic CQI report is included in the uplink grant transmitted from the base station 101, and is transmitted on a physical uplink shared channel (PUSCH) that is a data channel of a predetermined subframe after a designated number of subframes. A CQI is an indicator indicating a combination of a modulation system (QPSK, 64QAM or the like) and an error correction coding rate (¼, ⅞ or the like) when transmitting data from the terminal 102 to the base station 101. A signal to be transmitted from the terminal 102 is not limited to the CQI, and may be any signal transmitted on the data channel of the uplink such as dummy data.

In step S609, the terminal 102 transmits an ACK or a NACK regarding the DL data and the CQI to the base station 101 on the data channel of the uplink. Since the terminal 102 transmits the CQI, an ACK or a NACK that should be transmitted on the control channel of the uplink when no UL data exists is transmitted on the data channel.

In steps S610 and S611, the same processing as in steps S608 and S609 is respectively performed. As stated above, even if no UL data is transmitted from the terminal 102, the terminal 102 transmits the CQI in accordance with the aperiodic CQI report instruction. This allows the uplink and the downlink to use the same resource block. Accordingly, a neighboring base station (the base station 111 in this embodiment) can recognize the terminal 102, and subsequent interference in the downlink can be prevented.

Figure 7:
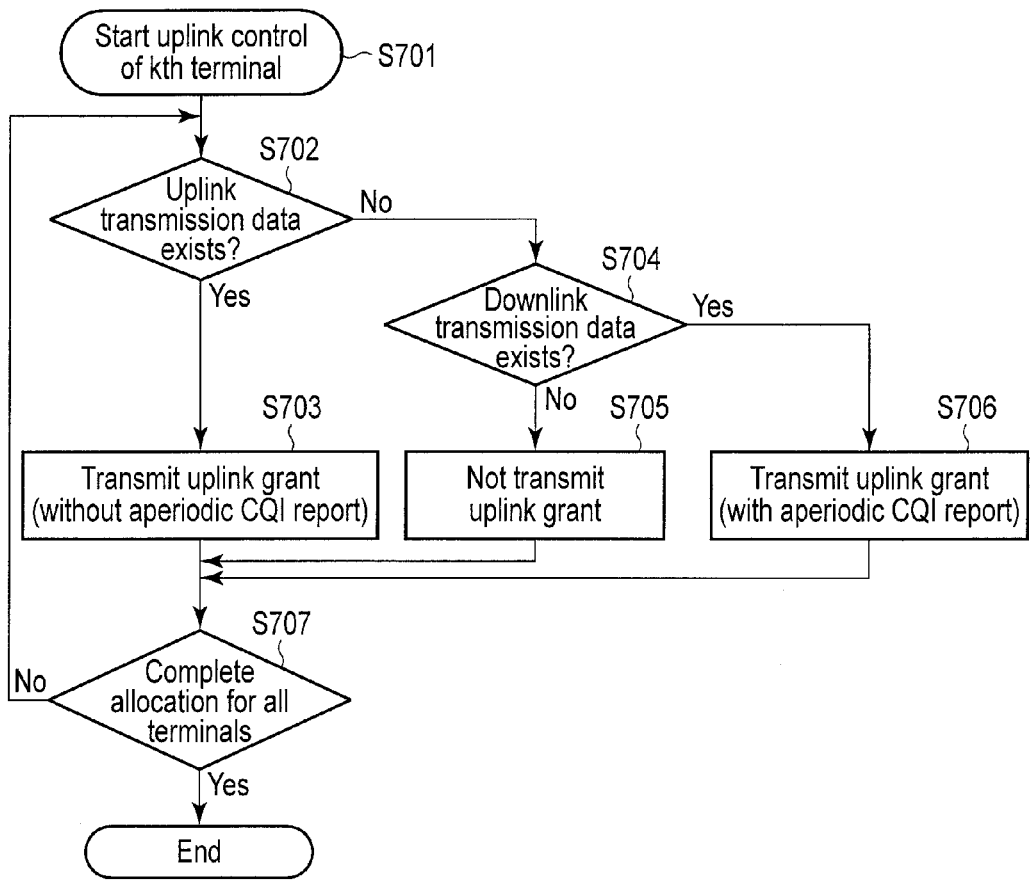
FIG. 7 is an exemplary flowchart illustrating the operation of the wireless resource controller.

The operation of the wireless resource controller 208 will be explained with reference to the flowchart shown in FIG. 7.

In step S701, allocation of subframe of nth uplink (n is a natural number) to kth terminal 102 (k is a natural number) is started.

In step S702, it is determined whether or not the kth terminal 102 holds UL data based on the BSR received from the terminal 102. If the terminal 102 holds the UL data, step S703 is executed. If not, step S704 is executed.

In step S703, data transmission from the terminal 102 in the subframe (data channel) of nth uplink is granted. In other words, the base station transmits an uplink grant to the terminal. In this case, it is not necessary for an aperiodic CQI report included in the uplink grant to be effective.

In step S704, it is determined whether or not DL data exists in a subframe of the downlink subsequent to the nth uplink. If DL data exists, step S705 is executed. If not, step S706 is executed.

In step S705, an uplink grant is not transmitted since reduction of interference received from the base station is not necessary if no DL data exists.

In step S706, an uplink grant is transmitted to the terminal by making the aperiodic CQI report included in the uplink grant effective to execute reduction of interference received from the base station.

In step S707, it is determined whether or not uplink allocation is completed for all terminals. If uplink allocation for all terminals is completed, the processing is terminated. If not, step S702 is returned to repeat the same processing. The operation of the wireless resource controller 208 is completed by the above processing.

According to the first embodiment described above, when data to be transmitted from the base station to the terminal exists, but no data to be transmitted from the terminal to the base station exists, an instruction of control signal (aperiodic CQI report) is transmitted. Accordingly, the terminal transmits the CQI on the data channel without transmitting a transmission acknowledgement on the control channel in the uplink. This allows uplink and downlink to use the same resource block, and allows a neighboring base station to recognize the terminal. Therefore, interference in the subsequent downlink can be prevented. That is, a wireless communication apparatus can improve the receiving quality of a terminal by reducing interference received from the base station.

(Second Embodiment)

In the first embodiment, the terminal uses the same resource block in any position within a cell associated with the base station. However, in the second embodiment, frequency allocation is changed in accordance with the area in which interference easily occurs. This improves the degree of freedom for frequency allocation, and realizes detailed control of the terminal in accordance with the environment.

Figure 8:
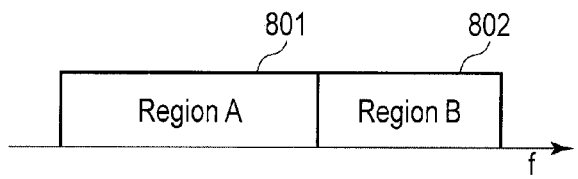
FIG. 8 illustrates an example of frequency allocation of a wireless communication apparatus according to the second embodiment.

An example of frequency allocation according to the second embodiment with reference to FIG. 8.

FIG. 8 shows frequency allocation in accordance with the cell associated with the base station. First band 801 is a frequency band allocated to region A (first region) in which a terminal receiving less interference exists such as the main area of the cell. Second band 802 is a frequency band allocated to region B (second region) in which a terminal receiving large interference such as the cell edge.

The degree of interference in the terminal can be determined based on information regarding the interference frequency, the degree of degradation of signal due to interference, or the packet loss probability due to interference received at the wireless resource controller 208 from the terminal. The wireless resource controller 208 determines the degree of interference by comparing the received value with a threshold. The wireless resource controller 208 determines that the interference is small if the received value is not more than the threshold, that the interference is large if the received value is greater than the threshold. In accordance with the determination results, the wireless resource controller 208 classifies the terminal into the region A or B, and controls transmission of DL data in accordance with the region in which the terminal exists.

For example, the probability of receiving interference is low in the center of the cell that is away from an adjacent cell. That is, it is not necessary for the downlink ASS to perform reduction of interference received from the base station for the terminal in the region A. Accordingly, MIMO transmission using multiple antennas is possible in the first band 801 in the downlink. This realizes high speed communication.

On the other hand, since the probability of receiving interference at the terminal from the adjacent cell is high in the region B, the same resource block is used for the uplink and downlink in the second band 802. In this case, reduction of interference received from both the terminal and the base station is performed, and receiving performance of the terminal will not be greatly degraded.

In the second embodiment, the first band 801 including the low frequency band is allocated to region A, and the second band 802 including the high frequency band is allocated to region B. However, allocation of the frequency band can be reversed. In addition, in the second embodiment, two regions and two bands are applied, but not limited thereto.

According to the aforementioned second embodiment, the receiving quality is prevented from being degraded by reducing interference received from the base station to the terminal arranged at the cell edge and receiving large interference, and throughput is improved by performing MIMO transmission to the terminal arranged at the center of the cell and receiving less interference. Changing frequency allocation according to the position of the terminal within a cell improves the degree of freedom of frequency allocation and realizes detailed control for the terminal according to the environment.

(Third Embodiment)

In the first embodiment, two or more subframes are arranged in the uplink in the time domain before the subframe of the downlink, an aperiodic CQI report is transmitted in all subframes of the uplink. However, an ACK or a NACK to the downlink can be transmitted in only one subframe, and it is not necessary to transmit an ACK or a NACK in multiple subframes. Transmission by multiple subframes is not desirable in terms of power consumption. In addition, since the state of propagation path constantly varies, it is highly possible that the propagation path response varies between the first subframe of the uplink and the last subframe of the uplink that is arranged immediately before the downlink.

In the third embodiment, an aperiodic CQI report is transmitted only in the subframe of the uplink that is arranged immediately before the downlink. This suppresses power consumption of the terminal, and reduces interference received from the base station since the CQI is transmitted to the base station in the subframe in which the state the propagation path is similar to that of the first subframe of the downlink. This reduces interference received from the base station.

The transmission signal of uplink grant of the wireless communication apparatus according to the third embodiment will be explained with reference to FIG. 9.

The frame format shown in FIG. 9 is an example of frame format defined for the LTE system. In frame format (a), two subframes of the uplink are arranged prior to two subframes of the downlink. This sequence is repeated. In frame format (b), three subframes of the uplink are arranged prior to one subframe of the downlink, and this sequence is repeated.

In the aforementioned frame format, the base station transmits an instruction of aperiodic CQI report to the terminal so that the terminal transmits a CQI in the subframe of the uplink arranged immediately before the downlink. Since the base station controls the transmission timing of the terminal as described above, the base station determines at what timing an instruction of aperiodic CQI report is transmitted to transmit it in the subframe of the uplink immediately before the downlink. The base station transmits an instruction of aperiodic CQI report to the terminal in the uplink so that the terminal transmits a CQI in the subframe immediately before the downlink. In the example shown in FIG. 9, the wireless resource controller 208 instructs to transmit a CQI in uplink 901 for the frame format (a), and instructs to transmit a CQI in uplink 902 for the frame format (b).

According to the third embodiment, an aperiodic CQI report is transmitted only in the subframe of the uplink immediately before the downlink. This suppresses power consumption of the terminal and reduces interference.

The detailed configuration of the wireless communication apparatus according to the present embodiment will be explained with reference to FIG. 10.

A wireless communication apparatus 1000 according to the third embodiment includes an antenna 1001, a low noise amplifier (LNA) 1002, filters 1003 and 1012, mixers 1004 and 1011, variable gain amplifiers (VGA) 1005 and 1010, an analog-to-digital convertor (ADC) 1006, a digital signal processor (DSP) 1007, a network processor 1008, a digital-to-analog convertor (DAC) 1009 and a power amplifier (PA) 1013. In FIG. 10, all elements except the DSP 1007 and network processor 1008 are provided as pairs and have sub-numbers. Since the function of these pairs is the same, the explanation will be given once for each element. FIG. 10 shows an example that the wireless communication apparatus 1000 includes two antennas 1001. However, three or more antennas 1001 may be included in the wireless communication apparatus 1000, and the number of elements except for the DSP 1007 and network processor 1008 may be determined according to the number of antennas.

The antenna 1001 externally receives a signal and obtains a received signal for receiving processing, as same as the antenna shown in FIG. 2. For transmission processing, the antenna 1001 receives an amplified transmission signal from the PA 1013 and externally transmits it.

The LNA 1002 receives the received signal from the antenna and amplifies the received signal.

The filter 1003 receives the amplified received signal from the LNA 1002 and performs filtering processing to the received signal in order to remove unnecessary frequency and to extract a signal of a desired frequency.

The mixer 1004 receives the received signal subjected to filter processing from the filter 1003, multiplies the received signal by a local signal received from the local transmitter (not shown) to perform downconversion, and obtains a baseband received signal.

The VGA 1005 receives the baseband received signal from the mixer 1004 and amplifies the baseband received signal.

The ADC 1006 receives the amplified baseband received signal from the VGA 1005, converts the analog signal into a digital signal, and obtains a digital received signal.

The DSP 1007 receives the digital received signal from the ADC 1006, and demodulates the digital received signal to generate a bit sequence. The DSP 1007 also perform the above-mentioned operation of the wireless communication apparatus (base station 101) as shown in FIG. 2, for example, reduction of interference received from the terminal, reduction of interference received from the base station, and instruction of transmitting a control signal.

The network processor 1008 receives the bit sequence from the DSP 1007, and performs processing to transmit it to the external Ethernet®. When data of the bit sequence is received from the Ethernet, the data is converted to a signal that can be processed by the DSP 1007.

The DAC 1009 receives a digital transmission signal from the DSP 1007, converts it to the analog transmission signal, and obtains a baseband transmission signal.

The VGA 1010 receives the baseband transmission signal from the DAC 1009 and amplifies the baseband transmission signal.

The mixer 1011 receives the amplified baseband transmission signal from the VGA 1010, multiplies an analog transmission signal by a local signal received from the local transmitter (not shown), and performs upconversion to obtain a transmission signal.

The filter 1012 receives the transmission signal from the mixer 1011, eliminates unnecessary frequency to obtain a transmission signal with a desired frequency.

The PA 1013 receives the transmission signal with the desired frequency from the filter 1012 and amplifies the transmission signal.

As stated above, with the configuration shown in FIG. 10, the operation of the wireless communication apparatus according to the present embodiment is established, and the degradation of receiving performance of the terminal can be suppressed. In FIG. 10, the DSP 1007 and the network processor 1008 are separated from each other; however, they may be integrally formed as a processor.

The data transmission and reception using the LTE frame format in the conventional wireless communication system will be explained with reference to FIG. 11.

FIG. 11A shows the frame format, and FIG. 11B is a conceptual diagram showing control of the uplink ASS and the downlink ASS. The numbers in the parentheses in FIG. 11A correspond to those in FIG. 11B.

Region 1101 enclosed with a broken line in FIG. 11A indicates a resource block. It is assumed that the base stations 101 and 111 reduce interference received both from the terminal and the base station in the subframe of the resource block. The terminal 112 is assumed to always transmit UL data to the base station 111 in the subframes (1) and (3) of the uplink in the resource block. In addition, it is assumed that after the terminal 102 transmits the UL data in the subframe (1) to the base station 101, the terminal 102 does not have UL data to be transmitted in subframe (3).

In the state shown in (1), the terminal 102 and the terminal 112 each transmit UL data to the base station 101 and the base station 111, respectively by using the same frequency, i.e., the subframe (1) of the uplink. In this state, the base station 101 and the base station 111 can reduce interference received from the terminal by applying the weight defined by the above-mentioned MMSE standard by the uplink AAS.

In the state shown in (2), the base station 101 and the base station 111 each transmit DL data to the terminal 102 and the terminal 112, respectively in the subframe (2) of the downlink. In this state, interference received from the base station is reduced by using the weighing factor generated in the uplink as a weight of the downlink AAS. Interference received by the terminal 112 from the base station 101 and that received by the terminal 102 from the base station 11 can be reduced.

In the state shown in (3), the terminal 102 does not have UL data to be transmitted to the base station 101. Based on the LTE system regulation, the terminal 102 transmits an ACK or a NACK regarding DL data on the control channel. That is, since no data is transmitted in the subframe (3), the base station 11 cannot recognize the presence of terminal 102. The base station 111 determines that no terminal 102 exists, and calculates a propagation path response. Thus, the base station 111 calculates the weight without considering possible interference from the terminal 102.

In the state shown in (4), as same as the sate of (2), the base station 101 and the base station 111 each transmit DL data to the terminal 102 and the terminal 112, respectively in the subframe (4) of the downlink. In this case, since the base station 111 does not consider the existence of terminal 102 when performing communication in the subframe (3), interference received by the terminal 102 from the base station 111 are not performed. Thus, the same resource block cannot be used for the uplink and the downlink. The terminal 102 receives interference by DL data transmitted to the terminal 112 from the base station 111, and the performance of receiving DL data from the base station 101 may be degraded.

In contrast, with the wireless communication apparatus according to the present embodiment, since CQI data is transmitted on the data channel of the resource block indicated by (3), neighboring base stations can realize the presence of the terminal, and interference received from the base station can be reduced. This suppresses degradation of receiving performance of the receiving terminal.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A wireless communication apparatus comprising:
a calculator configured to multiply a first weighting factor by a first data signal to be transmitted on a first channel, the first weighting factor being based on a second weighting factor multiplied by a second data signal received on the first channel; and
a controller configured to control a transmission to transmit to a destination device a control signal if the first data signal transmitted to the destination device exists, and no second data signal to be transmitted on the first channel exists in the destination device, the control signal including an instruction to transmit a signal on the first channel without transmitting a transmission acknowledge signal relating to the first data signal on a second channel which is different from the first channel.

2. The apparatus according to claim 1, wherein the controller controls a transmission to transmit to the destination device the control signal further including an instruction to transmit an indicator regarding channel quality on the first channel in a subframe.

3. The apparatus according to claim 1, wherein the first channel and the second channel are different in frequency.

4. The apparatus according to claim 1, wherein the controller divides a service area associated with the wireless communication apparatus into a first region in which interference is not more than a threshold and a second region in which the interference is greater than the threshold, and controls a transmission to transmit the control signal to the destination device existing within the second region.

5. The apparatus according to claim 1, wherein the controller instructs the destination device to transmit a signal on the first channel only in a subframe of a receiving segment arranged immediately before a subframe of a transmitting segment if a plurality of subframes of the receiving segment used for data reception are arranged prior to the subframe of the transmitting segment used for data transmission.

6. A wireless communication apparatus comprising:
a plurality of antennas;
a low noise amplifier configured to amplify a received signal received by the plurality of antennas:
a first filter configured to extract a received signal allocated to a first channel from the received signal;
a first mixer configured to multiply the received signal by a local signal and to generate a baseband received signal;
a first gain amplifier configured to amplify the baseband received signal;
a first convertor configured to perform analog-to-digital conversion relative to the baseband received signal to obtain a digital received signal;
a first signal processor configured to obtain a first bit sequence by performing signal processing to the digital received signal in receiving processing, and to obtain a digital transmission signal by performing signal processing to a second bit sequence in transmission processing;
a second signal processor configured to perform processing for transmitting the first bit sequence to an external network;
a second convertor configured to perform digital-to-analog conversion to the second bit sequence to obtain a baseband transmission signal;
a second gain amplifier configured to amplify the baseband transmission signal;
a second mixer configured to multiply the baseband transmission signal by the local signal to obtain a transmission signal;
a second filter configured to extract a transmission signal allocated to the first channel from the transmission signal; and
a power amplifier configured to amplify the extracted transmission signal,
wherein the first signal processor is configured to multiply a first weighting factor by a first data signal to be transmitted on a first channel, the first weighting factor being based on a second weighting factor multiplied by a second data signal received on the first channel, and further configured to control a transmission to transmit to a destination device a control signal if the first data signal transmitted to the destination device exists, and no second data signal to be transmitted on the first channel exists in the destination device, the control signal including an instruction to transmit a signal on the first channel without transmitting a transmission acknowledge signal relating to the first data signal on a second channel which is different from the first channel.

7. The apparatus according to claim 6, wherein the first signal processor controls a transmission to transmit to the destination device the control signal further including an instruction to transmit an indicator regarding channel quality on the first channel in a subframe.

8. The apparatus according to claim 6, wherein the first channel and the second channel are different in frequency.

9. The apparatus according to claim 6, wherein the first signal processor divides a service area associated with the wireless communication apparatus into a first region in which interference is not more than a threshold and a second region in which the interference is greater than the threshold, and controls a transmission to transmit the control signal to the destination device existing within the second region.

10. The apparatus according to claim 6, wherein the first signal processor instructs the destination device to transmit a signal on the first channel only in a subframe of a receiving segment arranged immediately before a subframe of a transmitting segment if a plurality of subframes of the receiving segment used for data reception are arranged prior to the subframe of the transmitting segment used for data transmission.

11. A wireless communication method comprising:
multiplying a first weighting factor by a first data signal to be transmitted on a first channel, the first weighting factor being based on a second weighting factor multiplied by a second data signal received on the first channel; and controlling a transmission to transmit to a destination device a control signal if the first data signal transmitted to the destination device exists, and no second data signal to be transmitted on the first channel exists in the destination device, the control signal including an instruction to transmit a signal on the first channel without transmitting a transmission acknowledge signal relating to the first data signal on a second channel which is different from the first channel.

12. The method according to claim 11, wherein the controlling the transmission controls a transmission to transmit to the destination device the control signal further including an instruction to transmit an indicator regarding channel quality on the first channel in a subframe.

13. The method according to claim 11, wherein the first channel and the second channel are different in frequency.

14. The method according to claim 11, wherein the controlling the transmission divides a service area associated with the wireless communication apparatus into a first region in which interference is not more than a threshold and a second region in which the interference is greater than the threshold, and controls a transmission to transmit the control signal to the destination device existing within the second region.

15. The method according to claim 11, wherein the controlling the transmission instructs the destination device to transmit a signal on the first channel only in a subframe of a receiving segment arranged immediately before a subframe of a transmitting segment if a plurality of subframes of the receiving segment used for data reception are arranged prior to the subframe of the transmitting segment used for data transmission.

* * * * *